US006301410B1

United States Patent
Carberry et al.

(10) Patent No.: US 6,301,410 B1
(45) Date of Patent: Oct. 9, 2001

(54) METHODS AND APPARATUSSES FOR PACKAGING LONG-PERIOD FIBER GRATINGS

(75) Inventors: Joel P. Carberry; Gang Chen; Peter Knowles, all of Horseheads; Glenn E. Kohnke, Painted Post; William J. Miller, Horseheads, all of NY (US); Robert A. Modavis, Santa Rosa, CA (US); Laura A. Weller-Brophy, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/876,208

(22) Filed: Jun. 6, 2001

Related U.S. Application Data

(62) Division of application No. 09/397,690, filed on Sep. 16, 1999, now Pat. No. 6,269,207.

(51) Int. Cl.[7] .................................................. G02B 6/34
(52) U.S. Cl. ................ 385/37; 385/31; 385/137; 359/130; 359/566
(58) Field of Search ........................... 385/37, 31, 123, 385/137; 359/130, 566

(56) References Cited

U.S. PATENT DOCUMENTS

| 5,694,503 | * | 12/1997 | Fleming et al. ............... 385/37 |
| 5,926,599 | * | 7/1999 | Bookbinder et al. ........... 385/137 |
| 6,101,301 | * | 4/2001 | Engelberth et la. ............ 385/37 |
| 6,122,430 | * | 9/2000 | Bookbinder et al. ........... 385/137 |
| 6,181,851 | * | 1/2001 | Pan et al. ...................... 385/37 |

FOREIGN PATENT DOCUMENTS

WO 9859267 * 12/1998 (WO) .............................. 385/37

* cited by examiner

Primary Examiner—Darren Schuberg
Assistant Examiner—Fayez Assaf
(74) Attorney, Agent, or Firm—Eric M. Smith

(57) ABSTRACT

Packages for long period fiber gratings and other optical components (and methods for forming the packages) are described. According to an aspect of the invention, a hollow tube surrounding an optical fiber containing a long-period grating is collapsed in two areas, forming a seal at each end of the tube. According to another aspect of the invention, a hollow tube with a shelf section at each end surrounds an optical fiber containing a long-period grating. The hollow tube is sealed at each end with a fused frit. According to another aspect of the invention, a hollow tube surrounding an optical fiber containing a long-period grating is sealed at each end with a glass plug.

10 Claims, 10 Drawing Sheets

METHODS AND APPARATUSSES FOR PACKAGING LONG-PERIOD FIBER GRATINGS

The present application is a divisional of U.S. patent application Ser. No. 09/397,690, filed Sep. 16, 1999 now U.S. Pat. No 6,269,207.

BACKGROUND OF THE INVENTION

1. Field of the Invention

The present invention relates generally to packaging of fiber optic components, and particularly to methods and apparatuses for packaging long-period fiber gratings, filters, and other fiber optic components to provide support and protection.

2. Technical Background

Long-period fiber gratings are formed by the addition of gratings to a length of optical fiber. Such gratings have an index of modulation along the waveguiding axis of the fiber, and may be formed by writing with UV radiation, etching, or other means of making periodic perturbations. One function of long-period fiber gratings is to couple light between the fundamental mode propagating in the waveguide core and a guided cladding mode.

For high performance applications such as gain-flattening filters (GFFs) in optical fiber amplifiers, long-period fiber gratings must operate over large temperature ranges with minimal change in spectral properties. While the peak loss of the grating will change with temperature, the primary effect of a temperature change is a shift in peak wavelength. Previously, this temperature dependence has been minimized by a variety of techniques including fiber design, fiber composition, and coating material. By varying fiber and grating parameters, both positive and negative wavelength shifts with increasing temperature are possible. The packaging of the optical fiber can compensate for this temperature dependence by attaching the long-period fiber grating to a negative or positive thermal expansion substrate. The packaging is therefore strongly dependent on the characteristics of the long-period fiber grating, which can be tailored to have a variety of strain and temperature dependencies.

Since long-period fiber gratings operate by coupling light between core and cladding modes, they are very sensitive to external perturbations. The grating is typically left uncoated because coatings change the optical properties of the grating. The long-period fiber grating package must therefore protect the region of fiber containing the grating. Some type of tube or rectangular box is therefore desirable to =p protect the bare fiber from moisture or physical damage, and prevent premature failure. Since long-period fiber gratings are sensitive to bending, the fiber is normally kept relatively straight within the package.

To obtain a typical hermetic (sealed against air and moisture) packaging of a long-period fiber grating, the fiber is metalized and soldered to a high quality package, such as an expensive Kovar® metal box. The package is then usually attached to a supporting substrate or fixture in a separate step. This solution is expensive both in terms of materials and processing time.

Accordingly, it would be highly advantageous to combine both the fiber support and protective functions in a single package that should protect the fiber from physical deformation as well as protect it from various environmental conditions. The process in which the package is constructed must not impart excessive thermal load to the grating area or damage the optical fiber at the point of contact between the package and the optical fiber.

SUMMARY OF THE INVENTION

The present invention provides advantageous methods and apparatus for packaging long-period fiber gratings and other fiber optic components to maintain support and protection. According to one aspect of the invention, a hollow tube surrounding an optical fiber containing a long-period grating is collapsed in two areas, forming a seal. The collapsed areas can be formed by a ring burner, Vytran™ splicer, $CO_2$ laser, or other methods.

According to another aspect of the invention, a hollow tube with a shelf section at each end is employed to form a frit sealed package. The hollow tube surrounds an optical fiber containing a long-period grating, and is sealed at each end by a copper alumino silicate frit fused to each shelf section.

According to another aspect of the invention, a hollow tube with a glass plug at each end is employed to form a glass sealed package.

A more complete understanding of the present invention, as well as further features and advantages of the invention, will be apparent from the following detailed description and the accompanying drawings.

DETAILED DESCRIPTION OF THE PREFERRED EMBODIMENTS

The present invention now will be described more fully with reference to the accompanying drawings, in which several currently preferred embodiments of the invention are shown. However, this invention may be embodied in various forms and should not be construed as limited to the exemplary embodiments set forth herein. Rather, these representative embodiments are described in detail so that this disclosure will be thorough and complete, and will fully convey the scope, structure, operation, functionality, and potential of applicability of the invention to those skilled in the art.

Figure 1:
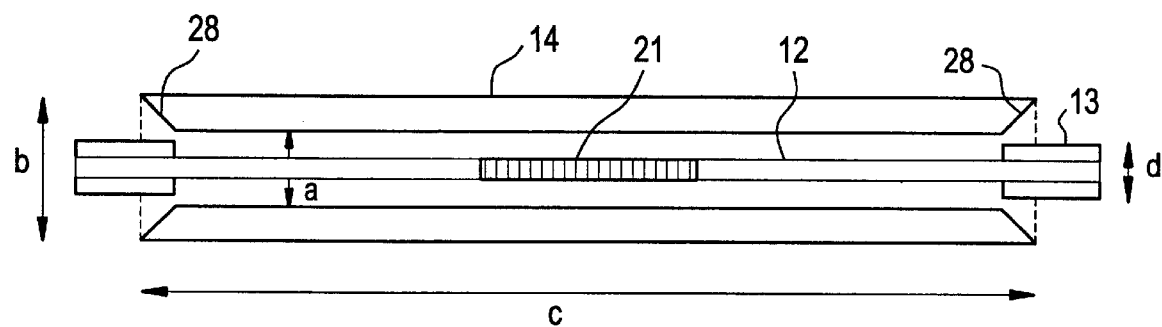
FIG. 1 is cross-sectional view of an optical fiber and a hollow tube in accordance with present invention.

Referring to the drawings, FIG. 1 shows a cross-sectional view of an optical fiber 12 and a hollow tube 14 in accordance with the present invention. The optical fiber 12 is partially enclosed by the hollow tube 14 having an inner diameter "a" (e.g., 255–300 $\mu$m), an outer diameter "b" (e.g., 2.65 mm) and a length "c" (e.g., 101.60 mm). The optical fiber 12 has an outer diameter "d" (e.g., 250 $\mu$m) and includes a coating 13 which has been stripped from a length of optical fiber 12 which is contained within the tube 14. The hollow tube 14 is composed of boron-doped silica or Pyrex®. The glass material of the hollow tube 14 has a coefficient of thermal expansion (CTE) similar to the CTE of the optical fiber 12, in order to minimize thermal stresses resulting from temperature changes. While presently preferred materials and dimensions are disclosed herein, one skilled in the art would appreciate that the hollow tube 14 of the present invention may be composed of a variety of materials and sizes, and should not be construed as limited to the embodiments or dimensions shown and described herein. The optical fiber 12 has written into it a long-period grating 20 along a portion of the length which has been stripped of the coating 13.

Figure 2:
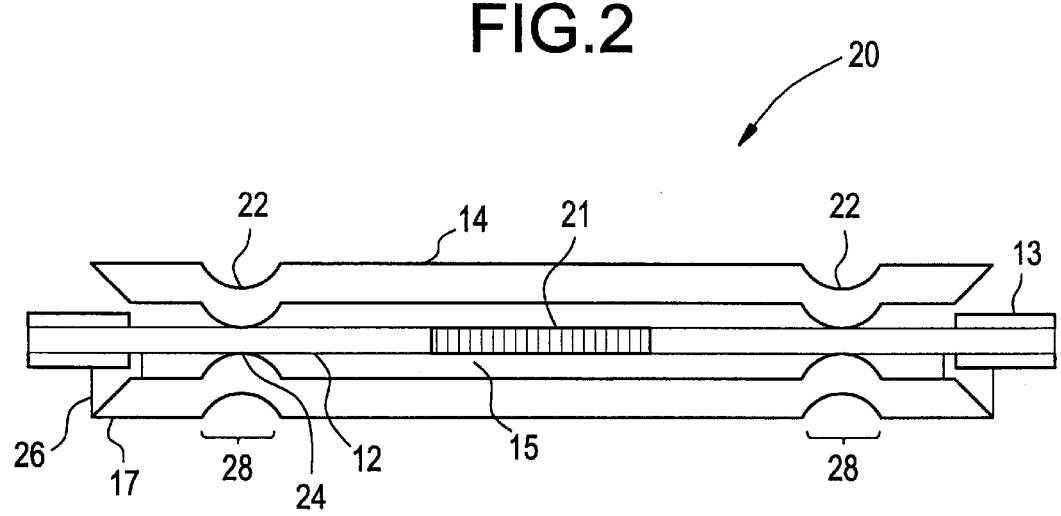
FIG. 2 is a cross-sectional view of a collapsed tube package in accordance with the present invention.

FIG. 2 shows a cross-sectional view of a collapsed tube package 10 in accordance with the present invention. Collapsed tube package 20 is formed, by methods described below, from the optical fiber 12 and tube 14 of FIG. 1. The tube 14 includes two collapsed regions 22, each collapsed region 22 having an inner wall 24 which is in concentric contact with the optical fiber 12, forming a seal. The hollow tube 14 with the collapsed regions 22 tensionally maintains and supports the region of the optical fiber 12 containing the long-period grating 21, and protects the long-period grating 21 from external perturbations (such as mechanical stress) and environmental conditions (such as moisture).

To provide strain relief, the collapsed tube package 20 also includes two epoxy plugs 26 disposed at each end 28 of the hollow tube 14. The epoxy plugs 26 generally cover a semicircular (180°) portion of each end 28. The ends 28 of the hollow tube 14 are funnel-shaped at an angle of 45° to facilitate placement of the epoxy plugs 26.

According to another aspect of the present invention, the collapsed tube package 20 may be encased in a carbon wrap (not shown) to provide another protective layer (e.g., 0.040–0.055 inches), providing additional protection from fracture. The carbon wrap is described in greater detail in U.S. Pat. No. 5,426,714 entitled "Optical Fiber Couplers Packaged For Resistance To Bending Or Breakage, and Methods Of Making The Same" which is incorporated by reference herein in its entirety.

Figure 3:
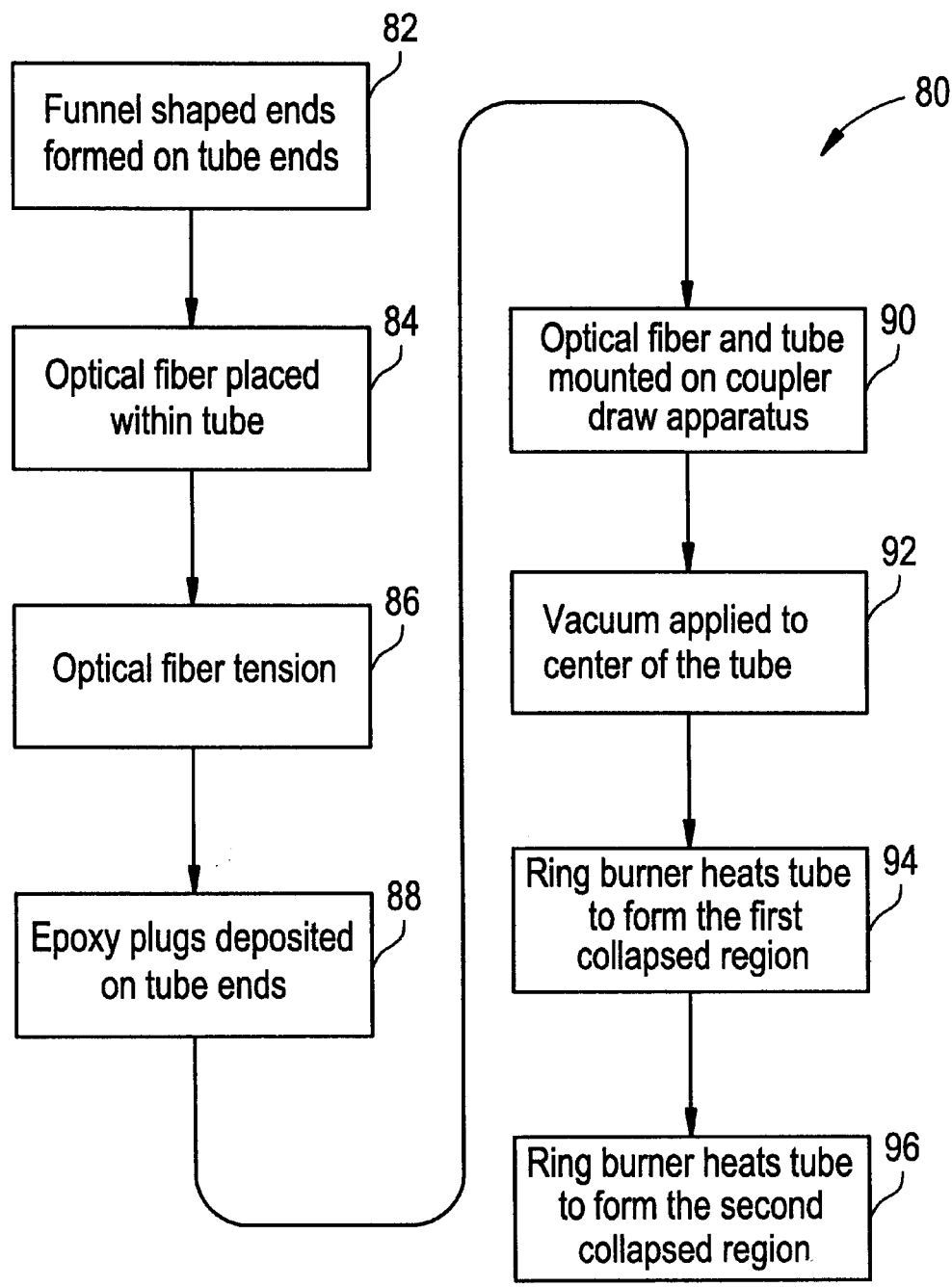
FIG. 3 is a flowchart of a method of forming the collapsed tube package of FIG. 2 in accordance with the present invention.
Figure 5:
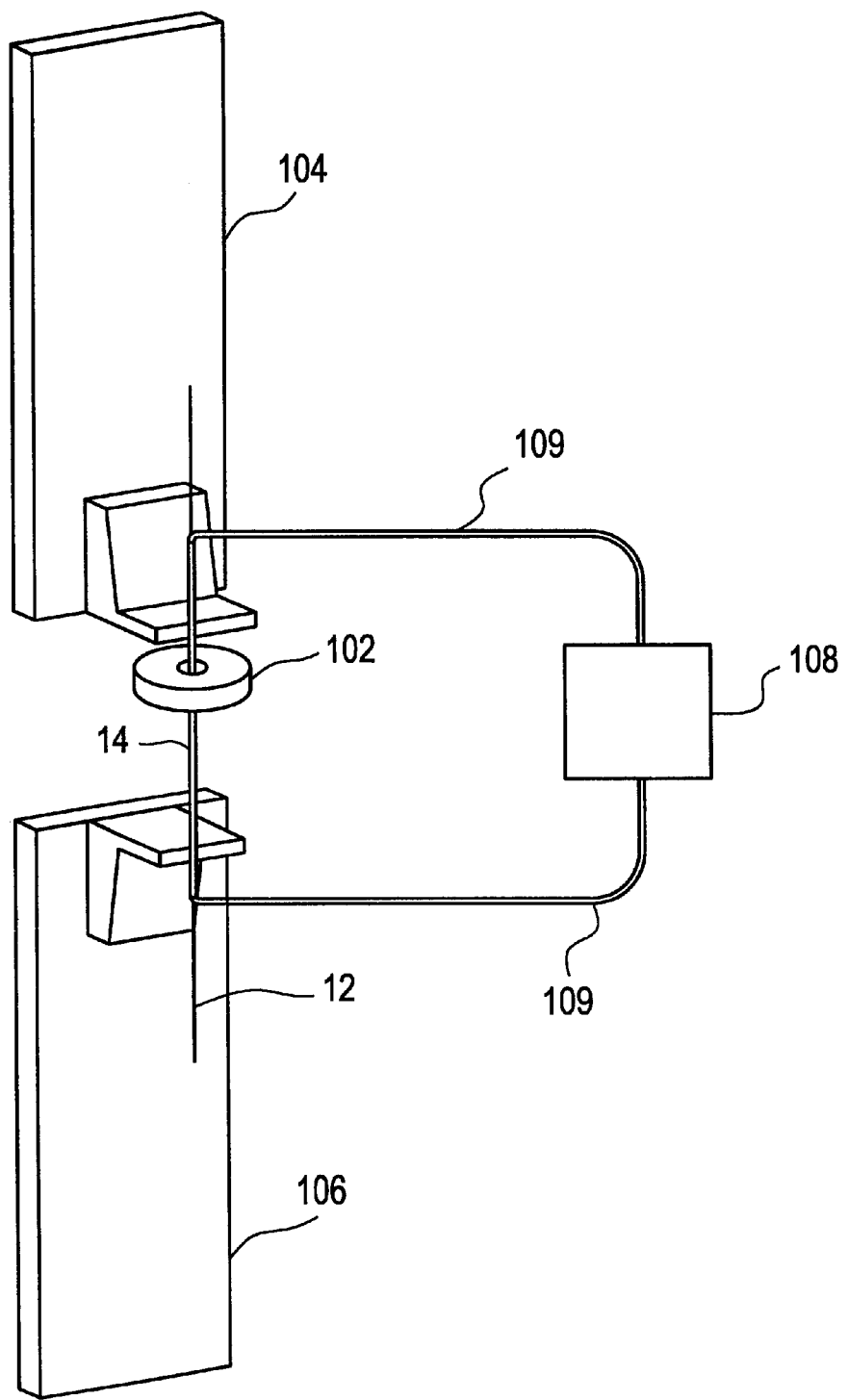
FIG. 5 is a view of a coupler draw apparatus used to form the collapsed tube package of FIG. 2.

FIG. 3 shows a method 80 of forming a collapsed tube package 20 utilizing the coupler draw apparatus 50 as shown in FIG. 5 in accordance with the present invention. In a first step 82, funnel-shaped ends (such as the funnel-shaped ends 28) are formed in a hollow tube (such as the hollow tube 14). To accomplish this, the hollow tube 14 is mounted in a vertical orientation and nitrogen triflouride ($NF_3$) gas is forced through a center bore 15 of the hollow tube 14. The hollow tube 14 is then rotated, and an angled oxygen and gas torch burns the $NF_3$, forming the funnel-shaped end 28. The oxygen and hydrogen gas torch is mounted at a 45° angle with respect to an outer surface 17 of the hollow tube 14.

Figure 4:
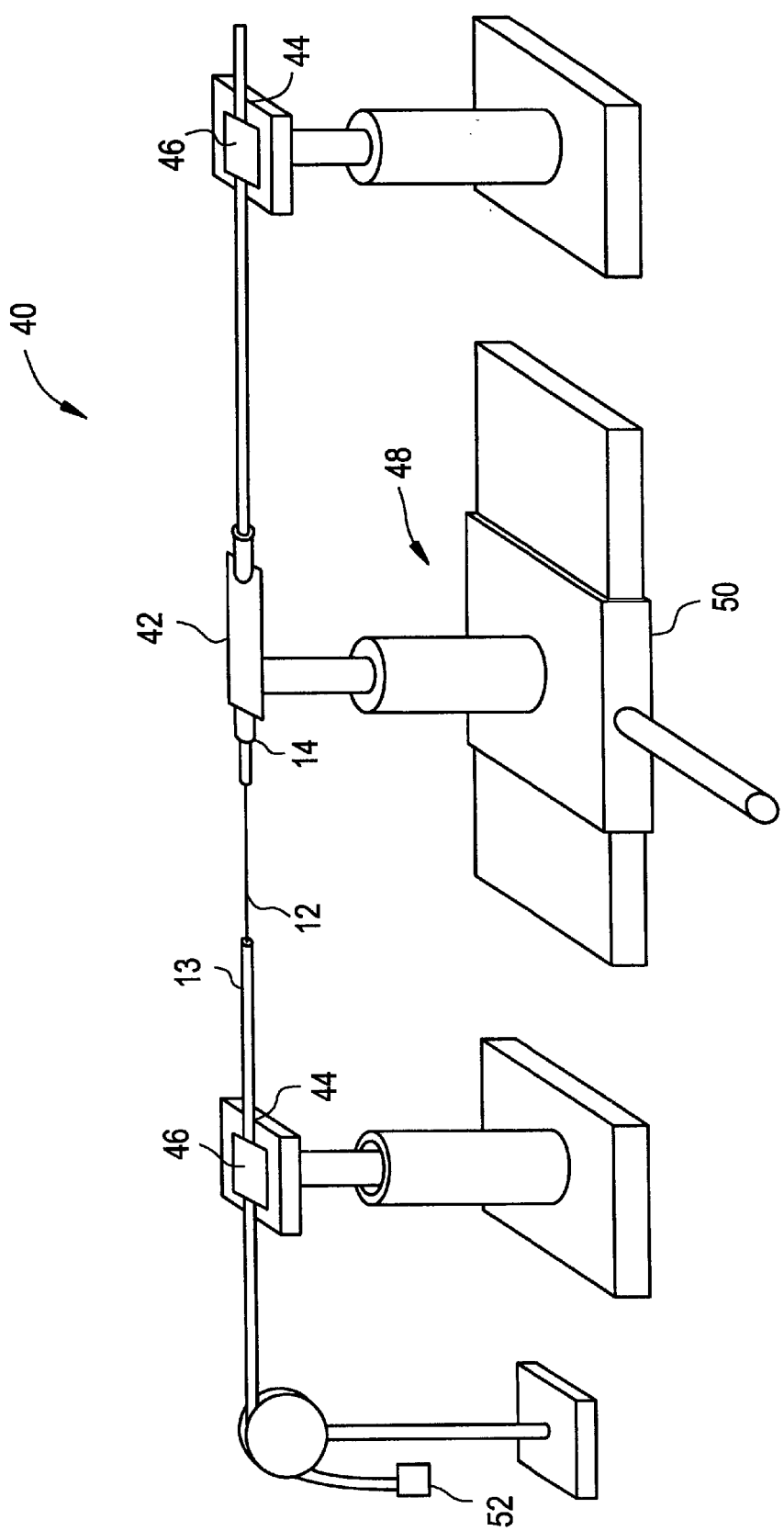
FIG. 4 is a view of an insertion apparatus in accordance with the present invention.

In a second step 84, an optical fiber (such as the optical fiber 12) is placed within the hollow tube 14 utilizing an insertion apparatus 40 shown in FIG. 4. To thread the optical fiber 12 into the hollow tube 14, a fixture 42 holds the hollow tube 14. The fiber 12 is placed into a precision V-groove 44 and held by a magnet 46, then aligned concentrically to the inside diameter of the hollow tube 14 with an X,Y, Z positioning stage 48. The positioning stage 48 is mounted onto a precise bearing slide 50 for transverse positioning. The fiber 12 is traversed axially into the tube 14 and centered. This individual alignment of the hollow tube 14 and optical fiber 12 with separate fixtures 42, 44 ensures there is no damage to the optical fiber 12 during the packaging process. During insertion, the coating 13 acts as a guide for the uncoated section of optical fiber 12 containing the grating 20, preventing the uncoated section from contacting the inner wall of the hollow tube 14.

Next, in a tensioning step 86, the optical fiber 12 is tensioned to between 5–20 thousand pounds per square inch by a weight 52. In a next tacking step 88, the ends 28 of the hollow tube 14 are tacked with epoxy plugs 26 to maintain the fiber 12 under tension in the center of the tube 14. Suitable epoxies are described in greater detail in U.S. Pat. No. 5,552,092 entitled "Waveguide Coupler" which is incorporated by reference herein in its entirety. Each epoxy plug 26 is applied manually into the ends 28 with a small syringe and is then UV cured. Nominal post cure time is 1.5 hr. at 125° C., or 16 hr. at 90° C. The epoxy plugs 26 also provide the additional benefit of preventing the optical fiber 12 from making contact with the inside surface of the hollow tube 14, which would lower the strength of the optical fiber 12.

As shown in FIG. 5, in a further embodiment of the present invention, a Multiclad® coupler draw apparatus 100 with an oxygen methane gas ring burner 102 is used to form the collapsed regions 22 of the collapsed tube package 10. The coupler draw 100 includes a first stage 104 and a second stage 106.

In step 90, tube 14 and optical fiber 12 are mounted on the coupler draw apparatus 100. A vacuum is applied to the hollow center of tube 14 in step 92 by a vacuum pump 108 (maximum vacuum ~25 inches) which is connected to the ends of hollow tube 12 by tubing 109.

Next, in a heating step 94, the ring burner 102 heats a first section 28 of the tube 14 to a temperature (700° C. for a Pyrex® tube, 1600° C. for an 8% boron-doped silica tube) allowing the tube 14 to flow and form a first collapsed region (such as the first collapsed region 22 of FIG. 2). The ring burner 102 has a profile that heats a ~5–10 mm length of the hollow tube 14. To minimize thermal damage to the optical fiber 12 from the heating, the material of tube 14 preferably has a melting temperature lower than the melting temperature of the optical fiber 12. This results in reduced stress during the packaging process 80 and the lifetime of the package 10.

The stages 104, 106 move in opposite directions during the heating step 94 to compensate for the loss of initial tension caused by the larger area of glass flow associated with the profile of the ring burner 102. The stages 104, 106 are driven by a computer controlled motor with a stepping motor resolution of ~25,000 steps per revolution with a resulting stage response of 100,000 steps per cm. As the tube 14 is heated, the vacuum assists in collapsing the tube 14 to form the collapsed section 22 which holds the optical fiber 12 evenly around its entire circumference. Due to the heat sensitivity of a grating (such as the grating 21) the tube 14 should be of sufficient length to assure that the grating 21 is not affected by heat from the ring burner 102. Furthermore, the heat must be evenly applied around the circumference of the tube 14 to ensure a uniform collapse in forming the collapsed sections 22. The heat profile is localized to keep the package 20 length to a minimum and ensure that the grating 21 is not exposed to a significant increase in temperature. In a positioning step 96, the stages 104, 106 move the optical fiber 12 and hollow tube 14 into position where a second section 28 of the tube 14 is contained within the ring burner 102. The ring burner 102 heats the second section 28 of the tube 14 to form the second collapsed region 22.

According to another aspect of the present invention, a $CO_2$ laser can be used to form each collapsed region 22 by heating two sections of the tube 14 (700° C. for a Pyrex® tube, or to 1600° C. for an 8% boron-doped silica tube). Use of the $CO_2$ laser allows heating a more localized section (e.g., 2 mm) of the tube 14, which in turn allows the use of a shorter overall length of the tube 14. Furthermore, the localized heating of the $CO_2$ minimizes any change in tension of the optical fiber 12 by reducing the length of optical fiber 12 which is exposed to thermal stress.

According to another aspect of the present invention, a Vytran™ large-diameter glass splicer (Vytran Corporation, Morganville, N.J. 07751) can be used to form each collapsed region 22 by heating two sections of the tube 14 (700° C. for a Pyrex® tube, or to 1600° C. for an 8% boron-doped silica tube).

Figure 6:
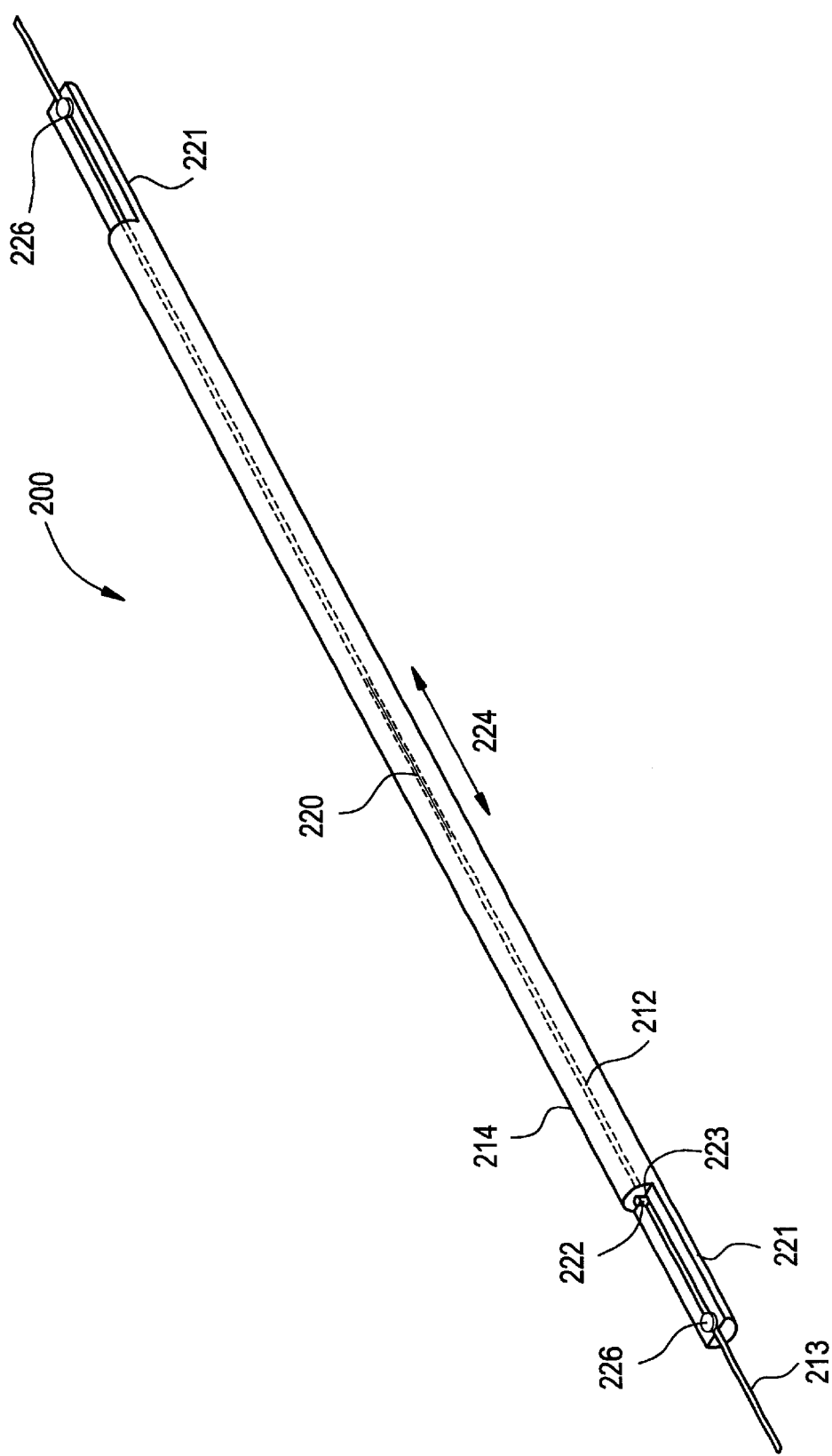
FIG. 6 is a view of a frit sealed tube package in accordance with the present invention.

Another embodiment of the present invention is shown in FIG. 6, which depicts a view of a frit sealed tube package 200. The frit sealed tube package 200 comprises an optical fiber 212 which is partially enclosed by a hollow tube 214 having openings 223 at each end. The tube 214 has an inner diameter (ID) (e.g., 255–300 $\mu$m), an outer diameter (OD) (e.g., 2.65 mm), and a length (e.g., 101.60 mm). A minimum ID of 255 $\mu$m allows the use of optical fiber 212 with a coating 213 having a combined diameter of 250 $\mu$m. The coating 213 has been removed from a length of optical fiber 212 which is contained within the tube 214. The tube 214 includes first and second shelf sections 221, each shelf section 221 having a length (e.g., 11.10 mm). In one embodiment, the hollow tube 214 is composed of boron-doped silica or Pyrex®, but should not be construed as limited only to the embodiments shown and described herein. The optical fiber 212 has written into it a grating 220 along a length 224 (e.g., 5–30 mm). A first frit 222 is fused to the optical fiber 212 and first shelf section 221. A second frit 222 is fused to the optical fiber 212 and second shelf section 221. Each frit 222 forms a hermetic seal in each opening 223. In one embodiment, each frit 222 is composed of copper alumino silicate. A $CO_2$ laser (or other heating methods) is used to fuse the frits 222 in place. An epoxy deposit 226 is disposed on each shelf section 221, holding the optical fiber 212 in place and providing strain relief. The epoxy deposit 226 is tailored to withstand at least 2.0 lb. tensile test, is UV curable, and has a coefficient of thermal expansion (CTE) of ~10×10$^{-7}$ parts per million (ppm).

Figure 7:
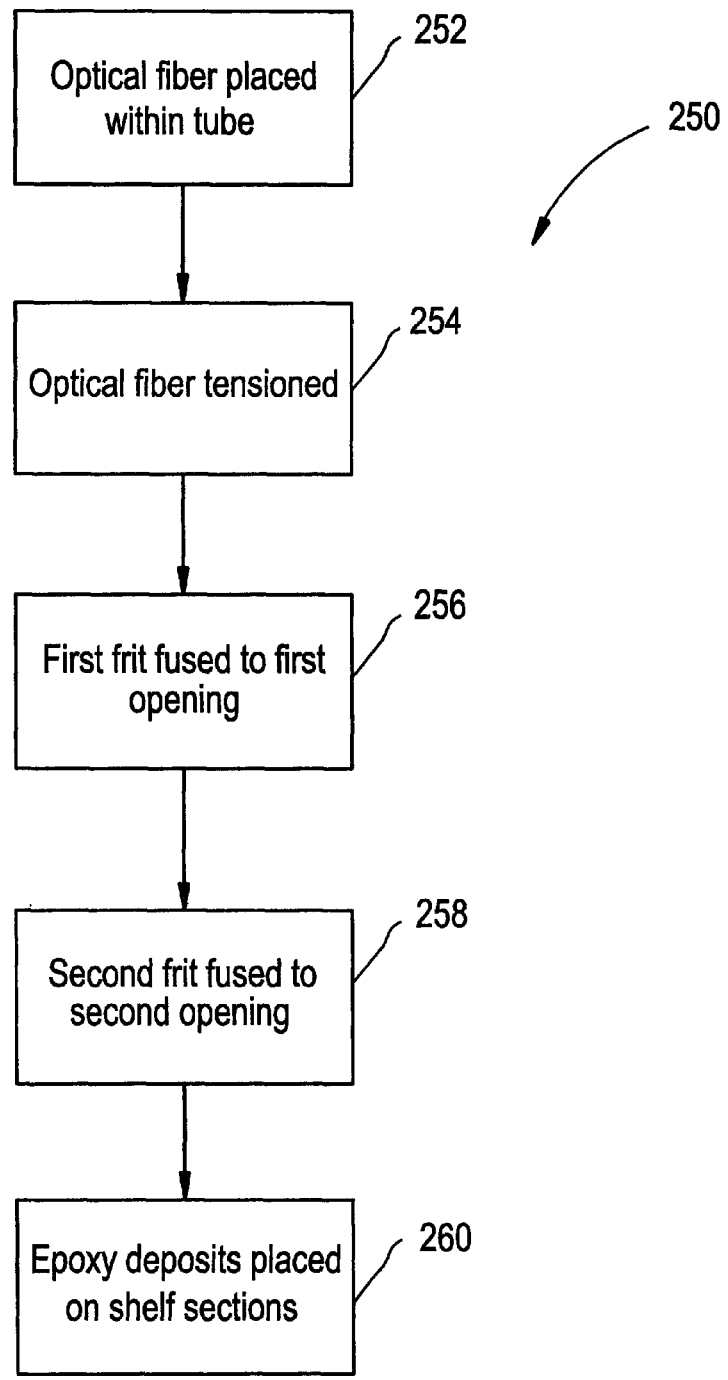
FIG. 7 is a flowchart of a method of forming the frit sealed tube package of FIG. 6 in accordance with the present invention.
Figure 8:
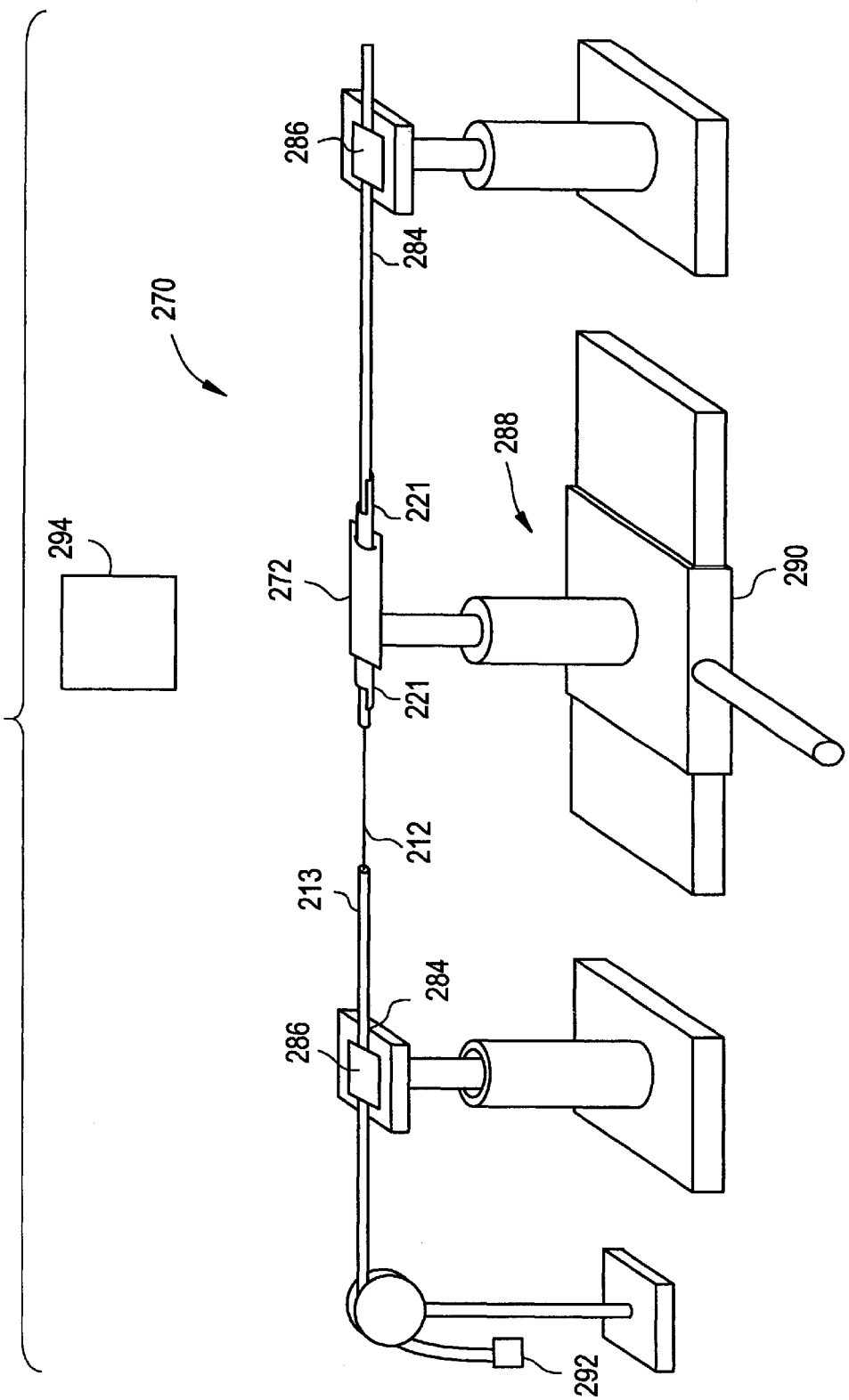
FIG. 8 is a view of an apparatus used for forming the frit sealed tube package of FIG. 6 in accordance with the present invention.

FIG. 7 shows a method 250 of forming a frit sealed tube package 10 in accordance with the present invention. In a first placement step 252, an optical fiber (such as the optical fiber 212) is placed within the hollow tube 214 utilizing an insertion apparatus 270 shown in FIG. 8. To thread the optical fiber 212 into the hollow tube 214, a fixture 272 holds the hollow tube 214. The fiber 212 is placed into a precision V-groove 284 and held by a magnet 286, then aligned concentrically to the inside diameter of the hollow tube 214 with an X,Y, Z positioning stage 288. The positioning stage 288 is mounted onto a precise bearing slide 290 for transverse positioning. The fiber 212 is traversed axially into the tube 214 and centered. This individual alignment of the hollow tube 214 and optical fiber 212 with separate fixtures 272, 284 ensures there is no damage to the optical fiber 212 during the packaging process. During insertion, the coating 213 acts as a guide for the uncoated section of optical fiber 212 containing the grating 220, preventing contact with the tube 214.

Next, in a tensioning step 254, the optical fiber 212 is tensioned to 5–20 thousand pounds per square inch by a weight 292. In a next fusing step 256, a first frit (such as the frit 222) is fused to the first opening 223 by a $CO_2$ laser 294. Next, in a positioning step 258, the laser 294 is repositioned, and the second frit 222 is then fused to the second opening 223. To provide strain relief, in a tacking step 260 an epoxy deposit 226 is placed on each shelf section 221 holding the optical fiber 212 in place. The epoxy is then UV exposed to initiate cure and then subjected to a final dark cure in an oven for 1.5 hr. at 125° C., or 16 hr. at 90° C. Suitable epoxies are described in greater detail in U.S. Pat. No. 5,552,092 entitled "Waveguide Coupler", which is incorporated by reference herein in its entirety.

Figure 9:
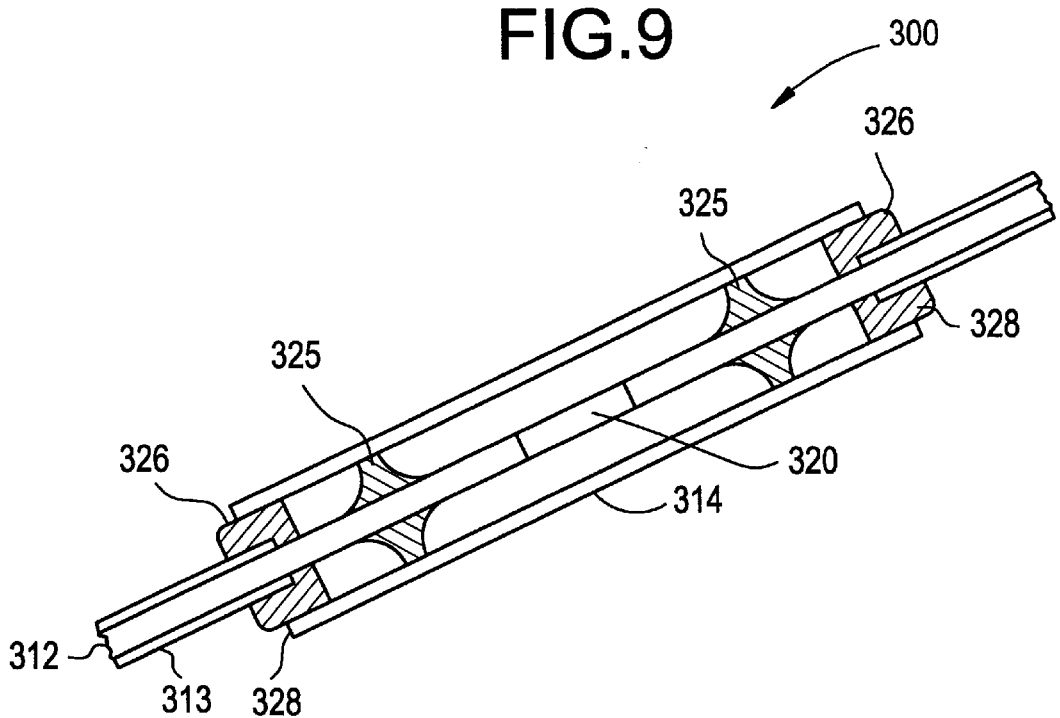
FIG. 9 is a cross-sectional view of a glass sealed tube package in accordance with the present invention.

Another alternative embodiment of the present invention is shown in FIG. 9, which depicts a cross-sectional view of a glass sealed tube package 300. The glass sealed tube package 300 comprises an optical fiber 312 which is partially enclosed by a hollow tube 314. The tube 314 has an inner diameter (ID) (e.g., 1 mm), an outer diameter (OD) (e.g., 2–3 mm), and a length (e.g., 3 inches). The optical fiber 312 includes a coating 313 which has been removed from a length of optical fiber 312, and is contained within tube 314. While in one embodiment, the hollow tube 314 is composed of glass silica, one skilled in the art would appreciate that the hollow tube 314 of the present invention can be composed of a variety of materials and sizes, and should not be construed as limited to the embodiments shown and described herein. The optical fiber 312 has written into it a grating 320. First and second glass plugs 325 are disposed within the tube 314 to form a hermetic seal at both ends of the tube 314. The glass plugs 325 are composed of a low melting temperature glass, such as copper glass, which has a melting temperature of 800° C. Glass sealed tube package 300 also includes two epoxy plugs 326 which are disposed at each end 328 of the hollow tube 314 and provide strain relief. The epoxy plugs 326 are composed of Corning epoxy MCA-91.

Figure 10:
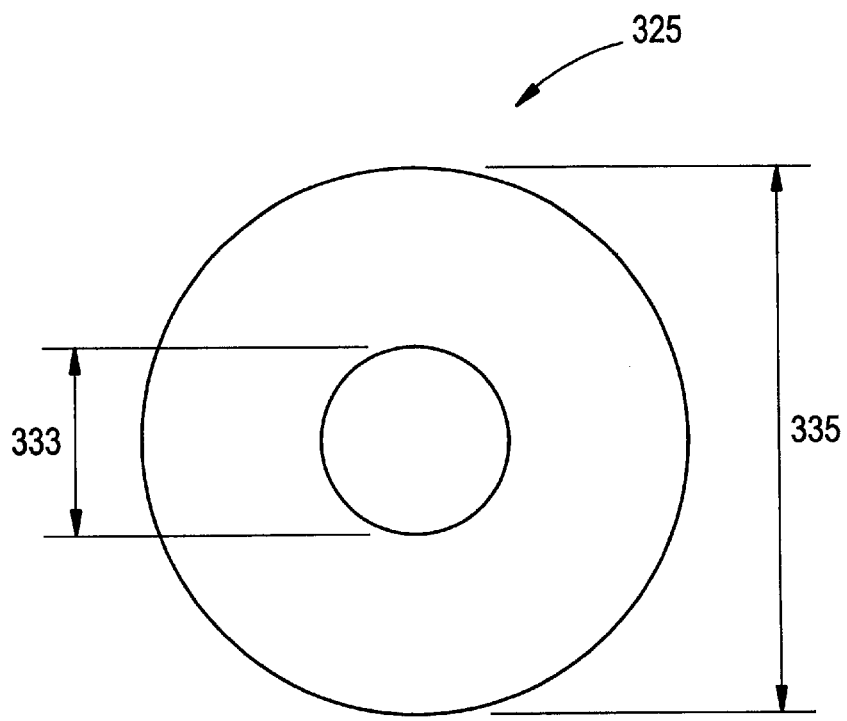
FIG. 10 is an end view of a glass disc in accordance with the present invention.

Each glass plug 325 is formed from a glass disk 331 (shown in FIG. 10) placed within the tube 314. When each glass disk 331 is heated to the melting temperature of the glass disks 331 (800° C. for copper glass), the glass disk 331 melts and flows, forming the glass plug 325. For an optical fiber 312 of 250 $\mu$m diameter, the glass disks 331 include an inner diameter 333 (e.g., 270 $\mu$m) which is slightly larger than the diameter of the optical fiber 312 and coating 313 removed (e.g., 250 $\mu$m). The glass disks 331 also have an outer diameter 335 (e.g., 950 $\mu$m) and a thickness (e.g., 475 $\mu$m).

Figure 11:
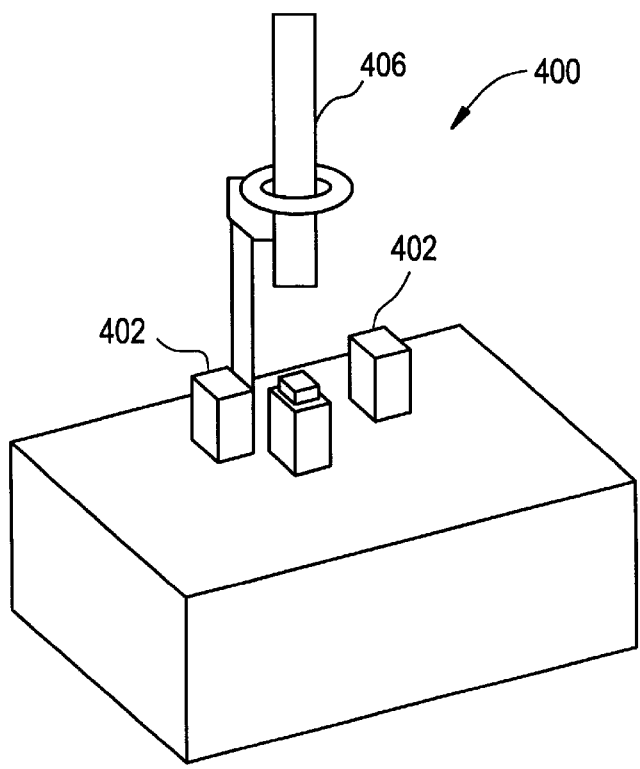
FIG. 11 is a perspective view of an apparatus used for forming the glass sealed tube package of FIG. 9.

The heating of the glass disks 331 can be accomplished by the use of a coupler draw apparatus (such as the coupler draw apparatus 50) a Vytran™ large diameter glass splicer 400 (shown in FIG. 11 and FIG. 12), an induction heater, a $CO_2$ laser, or other heaters and glass holding mechanisms. In one embodiment, the Vytran™ large diameter glass splicer 400 is utilized. The glass splicer 400 includes a pair of clamps 402 which hold the optical fiber 312 and the tube 314 in place. A tungsten filament 404 operates as the heat source and can traverse the length of the tube 314, allowing the tube and optical fiber to remain fixed while both glass disks 331 are heated. A camera 406 or other magnified visual inspection system can be used to ensure proper alignment of the optical fiber within the tube.

Figure 12:
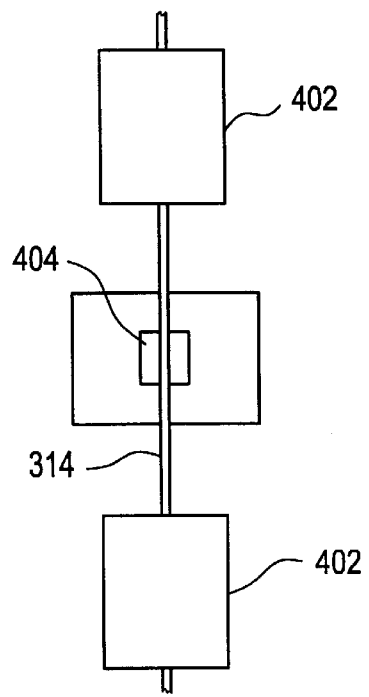
FIG. 12 is a top view of the apparatus of FIG. 11.
Figure 13:
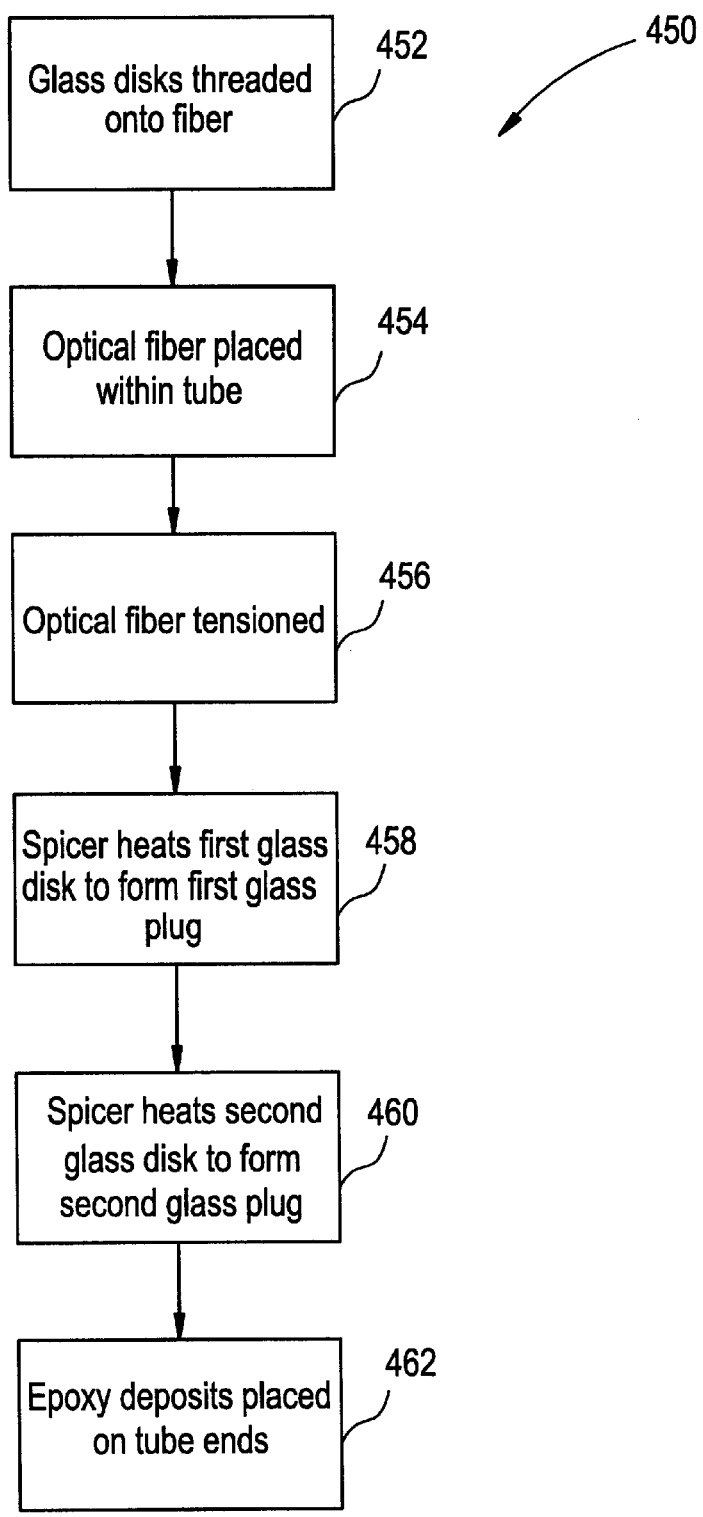
FIG. 13 is a flowchart of a method of forming the glass sealed tube package of FIG. 9 in accordance with the present invention.

In one method 450 (shown in FIG. 13) of forming a glass sealed tube package (such as the glass sealed tube package 300), the Vytran™ large diameter glass splicer 400 is utilized. In a first placement step 452, a pair of glass disks (such as the glass disks 331) are threaded onto the optical fiber 312. In a next placement step 454, the optical fiber 312 is placed within the tube 314 and locked in place by clamps 402. Next, in a tensioning step 456, the optical fiber is tensioned to 5–20 thousand pounds per square inch by a weight (not shown). In a heating step 458, the splicer 400 heats an area of the tube 314 causing the first glass disk 331 to melt and form a first glass plug. Next, in a heating step 460, the filament 404 moves so that a second area of the tube 314 is heated, causing the second glass disk 331 to melt and form a second glass plug. The heating temperature in the heating steps 458, 460 is 800° C. for glass disks 331 composed of copper glass. In order to preserve the strength of the optical fiber 312, the heating steps 458, 460 should be done with the tube 314 and optical fiber 312 in a vertical orientation as shown in FIG. 12. This ensures the glass disks 331 adhere evenly to the tube 314 and fiber 312. In other words, if the heating is done in a horizontal orientation, the glass disks 331 will tend to flow transversely towards the bottom of the tube 314 and form a radially uneven seal. In a tacking step 462, an epoxy plug 326 is deposited at each end 328 and UV cured for 30 seconds followed by a thermal post cure of at 125° C. for 4 hours.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

What is claimed is:

1. An optical waveguide device comprising:
    a tube having a center section, a first shelf section, a second shelf section, a first end, and a second end, said center section defining a cavity extending at least partially between said first end and said second end;
    an optical fiber longitudinally disposed within said cavity and adjacent to said first shelf section and said second shelf section; and
    a first frit and a second frit, said first frit fused to said optical fiber and said first shelf section at said first end to form a first hermetic seal, and said second frit fused to said optical fiber and second shelf section at said second end to form a second hermetic seal, such that a length of said optical fiber is tensionally secured between said first frit and said second frit.

2. The optical waveguide device of claim 1 further comprising:
    a long-period grating formed within the length of the optical fiber.

3. The optical waveguide device of claim 1 wherein the tube is boron doped silica glass.

4. The optical waveguide device of claim 1 wherein the tube is encased in a carbon wrap.

5. The optical waveguide device of claim 1 wherein the first frit and the second frit are composed of copper alumino silicate.

6. The optical waveguide device of claim 1 further comprising:
    a first epoxy plug disposed on both the first shelf section and the optical fiber; and
    a second epoxy plug disposed on both the second shelf section and the optical fiber, such that the optical fiber is secured to both the first shelf section and the second shelf section.

7. The optical waveguide device of claim 1 wherein the tube is generally cylindrical and has a cross-section which is generally circular.

8. The optical waveguide device of claim 1 wherein the tube defines a hollow bore, and the optical fiber is generally centered within said hollow bore.

9. A method for forming an optical waveguide device comprising the steps of:
    providing a tube having a center section, a first shelf section, a second shelf section, a first end, and a second end, said center section defining a cavity of a first predetermined diameter extending at least partially between said first end and said second end;
    providing an optical fiber of a second predetermined diameter, wherein said second predetermined diameter is less than said first predetermined diameter;
    inserting said optical fiber into said cavity such that said optical fiber is adjacent to said first shelf section and said second shelf section;
    fusing a first frit to said optical fiber and said first shelf section at said first end to form a first hermetic seal; and
    fusing a second frit to said optical fiber and said second shelf section at said second end to form a second hermetic seal.

10. The method of claim 9 further comprising the steps of:
    depositing a first epoxy plug on both the first shelf section and the optical fiber, such that the optical fiber is secured to the first shelf section; and
    depositing a second epoxy plug on both the second shelf section and the optical fiber, such that the optical fiber is secured to the second shelf section.

* * * * *